US008428376B2

(12) United States Patent
Feria

(10) Patent No.: US 8,428,376 B2
(45) Date of Patent: *Apr. 23, 2013

(54) PREDICTIVE-TRANSFORM SOURCE CODING WITH SUBBANDS

(75) Inventor: Erlan H. Feria, Princeton, NJ (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,477

(22) Filed: Apr. 2, 2012

(65) Prior Publication Data

US 2012/0308150 A1    Dec. 6, 2012

Related U.S. Application Data

(63) Continuation of application No. 12/374,415, filed as application No. PCT/US2007/079469 on Sep. 25, 2007, now Pat. No. 8,150,183.

(60) Provisional application No. 60/847,126, filed on Sep. 25, 2006.

(51) Int. Cl.
*G06K 9/36* (2006.01)

(52) U.S. Cl.
USPC ........... 382/238; 382/248; 382/251; 382/232; 382/250

(58) Field of Classification Search ................. 382/232, 382/233, 250, 251, 238, 245, 246; 348/409.1–419.1; 358/426.02–426.11
See application file for complete search history.

(56) References Cited

U.S. PATENT DOCUMENTS

| | | | |
|---|---|---|---|
| 6,760,479 B1 * | 7/2004 | Feria | 382/238 |
| 7,046,856 B2 * | 5/2006 | Feria et al. | 382/248 |
| 2003/0113024 A1 * | 6/2003 | Feria et al. | 382/238 |

* cited by examiner

*Primary Examiner* — Ali Bayat
(74) *Attorney, Agent, or Firm* — Hiscock & Barclay, LLP; Peter J. Mikesell; Christopher J. White

(57) ABSTRACT

A method, system, and apparatus are directed towards computing minimum mean squared error (MMSE) predictive-transform (PT) source coding integrated with subband compression to further improve the performance of low bit rate MMSE PT source coders. A desirable byproduct of the advanced scheme is that the incorporation of joint optimum prediction and transformation from subband to subband is ideally suited to its integration with JPEG2000 to yield even higher compression levels while producing an outstanding objective as well as subjective visual performance.

4 Claims, 12 Drawing Sheets

$$y \in R^{64} \quad \boxed{f_t(y)} \quad \begin{array}{|c|} \hline X_1 \ldots X_8 \\ X_9 \ldots X_{16} \\ \hline \end{array}$$

$$\{X_k \in R^4 : k = 1, \ldots, 16\}$$

$$\begin{array}{cccccccc}
y_{11} & y_{12} & y_{13} & y_{14} & y_{15} & y_{16} & y_{17} & y_{18} \\
y_{21} & y_{22} & y_{23} & y_{24} & y_{25} & y_{26} & y_{27} & y_{28} \\
y_{31} & y_{32} & y_{33} & y_{34} & y_{35} & y_{36} & y_{37} & y_{38} \\
y_{41} & y_{42} & y_{43} & y_{44} & y_{45} & y_{46} & y_{47} & y_{41} \\
y_{51} & y_{52} & y_{53} & y_{54} & y_{55} & y_{56} & y_{57} & \boxed{y_{58}} \\
y_{61} & y_{62} & y_{63} & y_{64} & y_{65} & y_{66} & y_{67} & y_{68} \\
y_{71} & y_{72} & y_{73} & y_{74} & y_{75} & y_{76} & y_{77} & y_{78} \\
y_{81} & y_{82} & y_{83} & y_{84} & y_{85} & y_{86} & y_{87} & y_{88} \\
\end{array}$$

$$X_{16} = [y_{58} \quad y_{68} \quad y_{78} \quad y_{88}]^t$$

*FIG. 3*

PREDICTIVE-TRANSFORM SOURCE CODING WITH SUBBANDS

CROSS-REFERENCE TO RELATED APPLICATIONS

This application claims the benefit U.S. Provisional Patent Application No. 60/847,126 filed on Sep. 25, 2006, the contents of which are hereby incorporated by reference in their entirety.

FIELD OF THE INVENTION

The present invention relates generally to data compression, and more particularly, but not exclusively, to the use of predictive-transform (PT) source coders for data compression.

BACKGROUND OF THE INVENTION

Recently it was shown that wavelets based JPEG2000 [1] can yield remarkably 'poor' results when applied to synthetic aperture radar (SAR) images that are being used in knowledge-aided airborne moving target indicator (AMTI) radar applications [5]. To demonstrate these surprising results a very simple strip-processor minimum mean squared error (MMSE) predictive-transform (PT) source coder was used [2]. The reason for JPEG2000's poor performance, more than 5 dBs worse for the SAR image under test [5], may be traced to the significant difference in correlation between adjacent horizontal and adjacent vertical pixels found in typical SAR images. Fortunately PT source coding offers a very simple solution to this problem. This is the case since its optimum design of prediction and transformation matrices in a flexible pixel geometry processing environment explicitly takes into consideration the vastly different horizontal and vertical pixel correlations. In addition, there are now available fast on-line PT implementation algorithms that are based on even/odd eigenvector decompositions [4] and/or Hadamard structures [6]. However, for standard images such as those given in the JPEG suitcase as well as the Lena image it has been found that PEG2000 performs satisfactorily. This is due to the use of subband coding that produces an exceptionally appealing objective and subjective visual performance when the correlation between adjacent horizontal and adjacent vertical pixels does not vary significantly, as is the case for this type of images. On the other hand, the current predictive transform strategy still needs to be refined to yield results that are significantly superior to those of JPEG2000 when compressing images such as those found in the JPEG suitcase.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 3 shows an Image Coding Illustration: Transform Pre-Processing;

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Since JPEG2000 does not use prediction from subband to subband it stands to reason that the structural flexibility of MMSE PT source coding may be transported to subband coding to achieve even better results. This is one of the problems to which this invention is directed.

Briefly, the presented invention is directed to minimum mean squared error (MMSE) predictive-transform (PT) source coding integrated with subband compression to further improve the performance of low bit rate MMSE PT source coders. A desirable byproduct of the advanced scheme is that the incorporation of joint optimum prediction and transformation from subband to subband is ideally suited to its integration with JPEG2000 to yield even higher compression levels while producing an outstanding objective as well as subjective visual performance.

Figure 1:
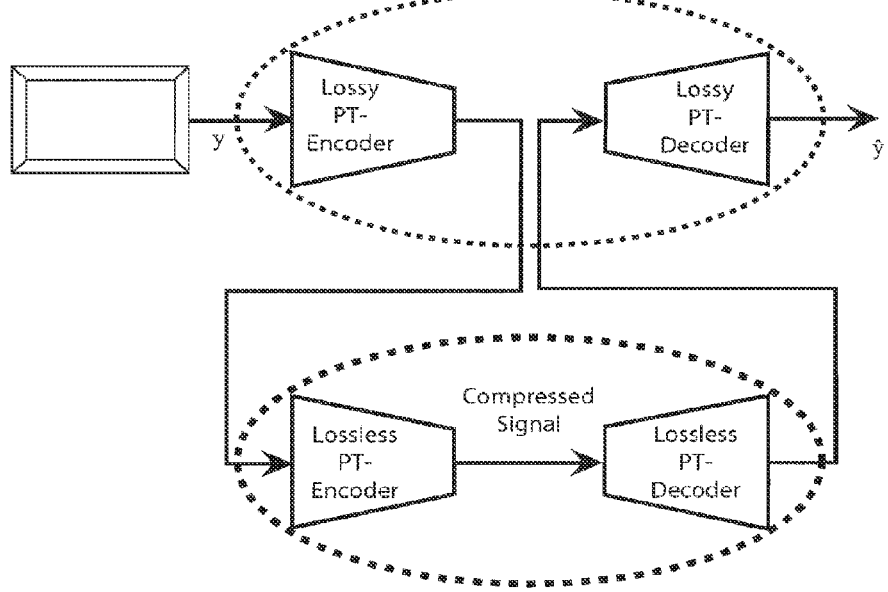
FIG. 1 shows a PT Source Coder Architecture.
Figure 2:
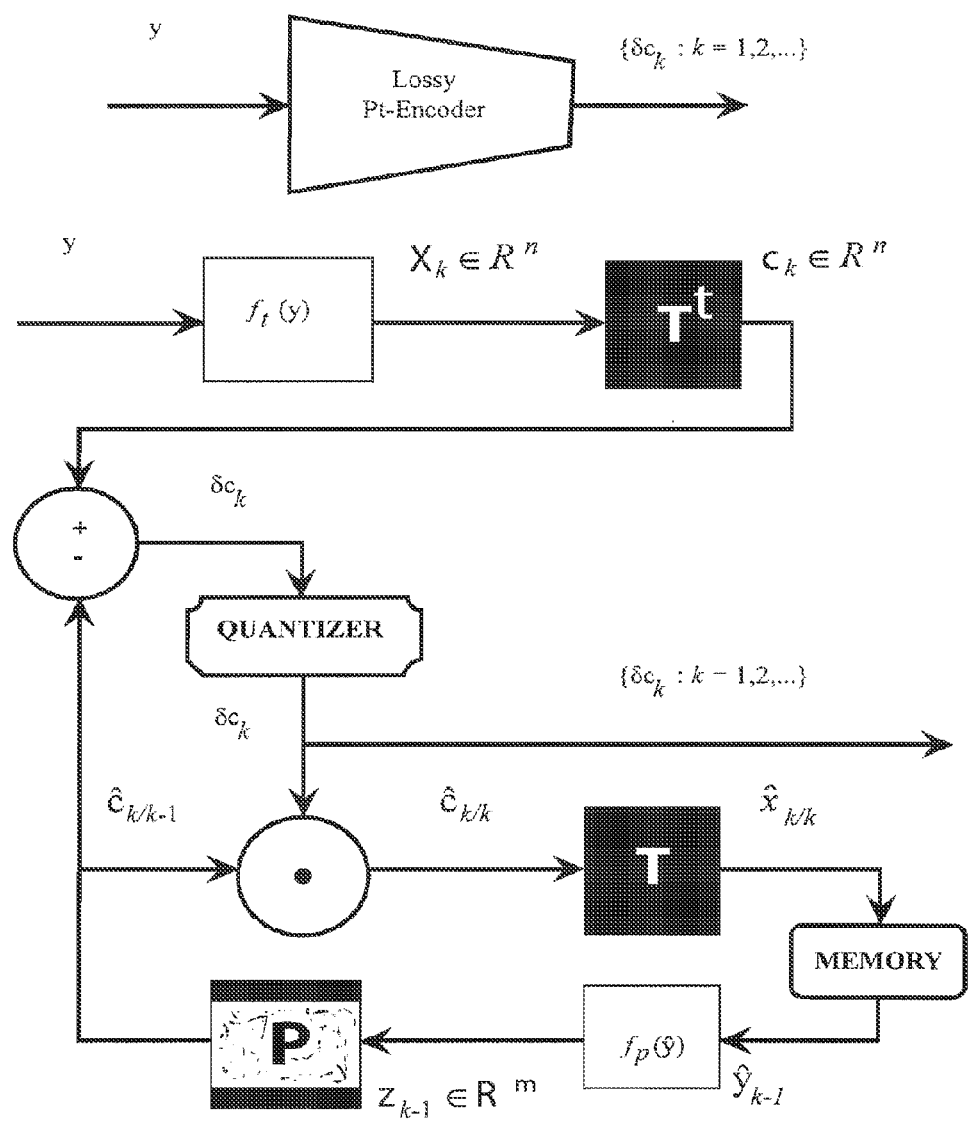
FIG. 2 shows a Lossy PT Encoder Structure.

In FIG. 1 the overall PT source coder architecture is shown. It has as its input the output of a signal source y. As an illustration this output will be assumed to be a real matrix representing 2-D images. The structure includes two distinct sections. In the upper section the lossy encoder and associated lossy decoder are depicted while in the lower section the lossless encoder and decoder are shown. The lossless section of the coder is explained in detail in [2] and will not be discussed here since it is generally different from that used in subband compression [1]. In FIG. 2 the lossy PT encoder structure is shown. It includes a transform preprocessor $f_T(y)$ whose output $X_k$ is a real n dimensional column vector. In FIG. 3 an image illustration is given where y is a matrix consisting of 64 real valued picture elements or pixels and the transform pre-processor produces sixteen n=4 dimensional pixel vectors $\{X_k:k=1, \ldots, 16\}$. The pixel vector $X_k$ then becomes the input of an n×n dimensional unitary transform matrix T. The multiplication of the transform matrix T by the pixel vector $X_k$ produces an n dimensional real valued coefficient column vector $c_k$. This coefficient, in turn, is predicted by a real n dimensional vector $\hat{c}_{k/k-1}$. The prediction vector $\hat{c}_{k/k-1}$ is derived by multiplying the real m dimensional output $Z_{k-1}$ of a predictor pre-processor (constructed using previously encoded pixel vectors as will be seen shortly), by a m×n dimensional real prediction matrix P. A real n dimensional coefficient error $\delta c_k$ is then formed and subsequently quantized yielding $\delta \hat{c}_k$. The quantizer has two assumed structures. One is an "analog" structure that is used to derive analytical design expressions for the P and T matrices and another is a "digital" structure used in actual compression applications. The analog structure includes allowing the most energetic elements of $\delta c_k$ to pass to the quantizer output unaffected and the remaining elements to appear at the quantizer output as zero values, i.e., $$\delta c_k(i) = \begin{cases} \delta c_k(i) & i = 1, \ldots, d \\ 0 & i = d+1, \ldots, n. \end{cases} \quad (2.1)$$

The digital structure includes multiplying $\delta c_k$ by a real and scalar compression factor 'g' and then finding the closest integer representation for this real valued product, i.e., $$\delta c_k \lfloor = g \delta c_k + \frac{1}{2} \rfloor. \quad (2.2)$$

Figure 4:
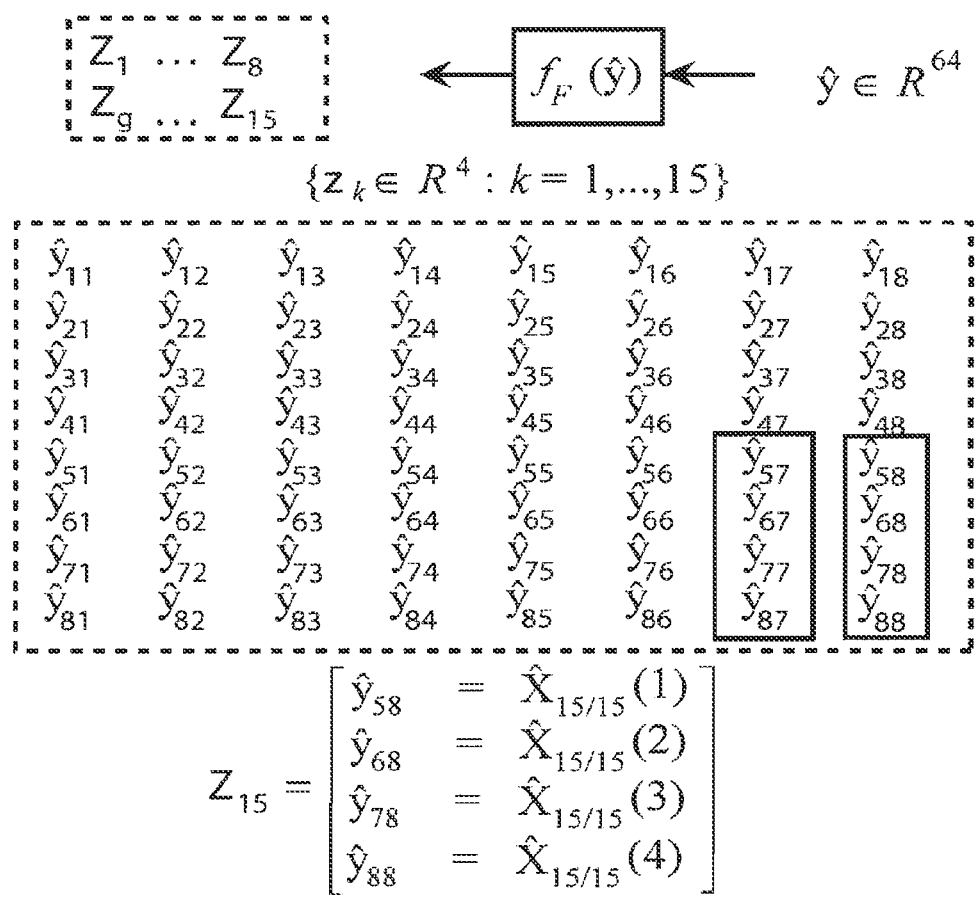
FIG. 4 shows an Image Coding Illustration: Prediction Pre-Processing.

The quantizer output $\delta c_k$ is then added to the prediction coefficient $\hat{c}_{k/k-1}$ to yield a coefficient estimate $\hat{c}_{k/k}$. Although other types of digital quantizers exist [3] the quantizer used here (2.2) is the simplest one to implement and yields outstanding results as seen in our simulations [2]. The coefficient estimate $\hat{c}_{k/k}$ is then multiplied by the transformation matrix T to yield the pixel vector estimate $\hat{X}_{k/k}$. This estimate is then stored in a memory which contains the last available estimate $\hat{y}_{k-1}$ of the pixel matrix y. Note that the initial value for $\hat{y}_{k-1}$, i.e., $\hat{y}_0$ can be any reasonable estimate for each pixel. For instance, since the processing of the image is done in a sequential manner using prediction from pixel block to pixel block, the initial $\hat{y}_0$ can be constructed by assuming for each of its pixel estimates the average value of the pixel block $x_1$. FIG. 4 shows for the illustrative example how the image estimate at processing stage k=16, i.e., $\hat{y}_{k-1} = \hat{y}_{15}$ is used by the predictor preprocessor to generate the pixel estimate predictor preprocessor vector $Z_{15}$. Also note from the same figure how at stage k=16 the 4 scalar elements ($\hat{y}_{57}, \hat{y}_{67}, \hat{y}_{77}, \hat{y}_{87}$) of the 8×8 pixel matrix $\hat{y}_{15}$ are updated making use of the most recently derived pixel vector estimate $\hat{x}_{15/15}$. Next the design of the T and P matrices of the PT, source coder is reviewed.

The design equations for the T and P matrices are derived by minimizing the mean squared error expression $$E[(X_k - \hat{X}_{k/k})^t (X_k - \hat{X}_{k/k})] \quad (2.3)$$

with respect to T and P and subject to three constraints. They are:
1) The elements of $\delta c_k$ are uncorrelated from each other.
2) The elements of $\delta c_k$ are zero mean.
3) The analog quantizer of (2.1) is assumed.

After this minimization is performed coupled Wiener-Hopf and Eigensystem design equations are derived [4]. They are:

$$P = [ I_m \quad O_{m \times 1} ] JT, \quad (2.4)$$

$$\{E[x_k x_k^t] - [E[x_k z_{k-1}^t] E[x_k]] J\} T = T\Lambda \quad (2.5)$$

$$J = \begin{bmatrix} E[z_{k-1} z_{k-1}^t] & E[z_{k-1}] \\ E[z_{k-1}^t] & 0 \end{bmatrix}^{-1} \begin{bmatrix} E[z_{k-1} x_k^t] \\ E[x_k^t] \end{bmatrix} \quad (2.6)$$

where these expressions are a function of the first and second order statistics of $X_k$ and $Z_{k-1}$ including their cross correlation. To find these statistics the following isotropic model for the pixels of y can be used [4]:

$$E[y_n] = K, \quad (2.7)$$

$$E[(y_0 - K)(y_{i+v,j+h} - K)] = (P_{avg} - K^1) \rho^D \quad (2.8)$$

$$D = \sqrt{(rv)^2 + h^2} \quad (2.9)$$

$$\rho = E[(y_{ij} - K)(y_{i,j+1} - K)]/(P_{avg} - K^2) \quad (2.10)$$

where v and h are integers, K is the average value of any pixel, $P_{avg}$, is the average power associated with each pixel, and r is a constant that reflects the relative distance between two adjacent vertical and two adjacent horizontal pixels (r=1 when the vertical and horizontal distances are the same).

Figure 5:
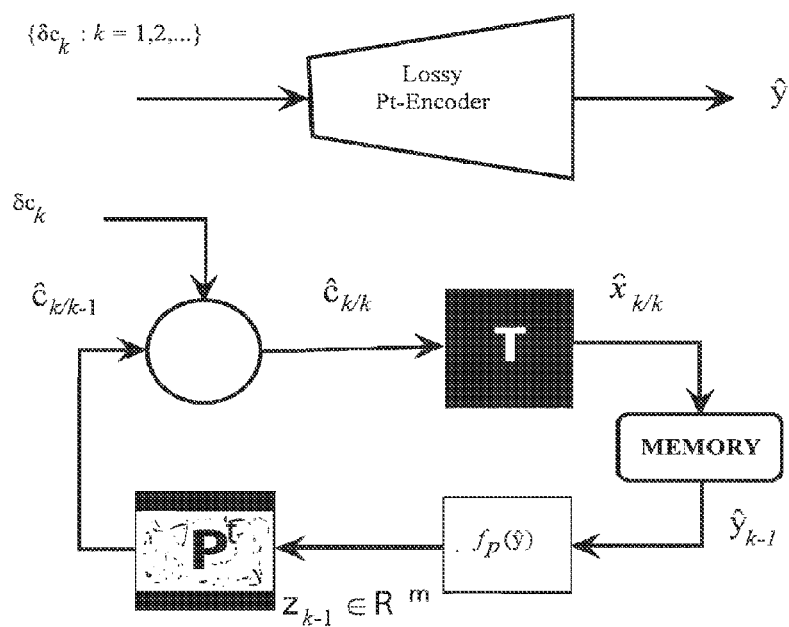
FIG. 5 shows a Lossy PT Decoder.

In FIG. 5 the lossy PT decoder is shown and is noted to be identical in structure to the feedback section of the encoder section of FIG. 2. Next we adapt the aforementioned predictive-transform methodology to the subband memory space compression of images.

Figure 6:
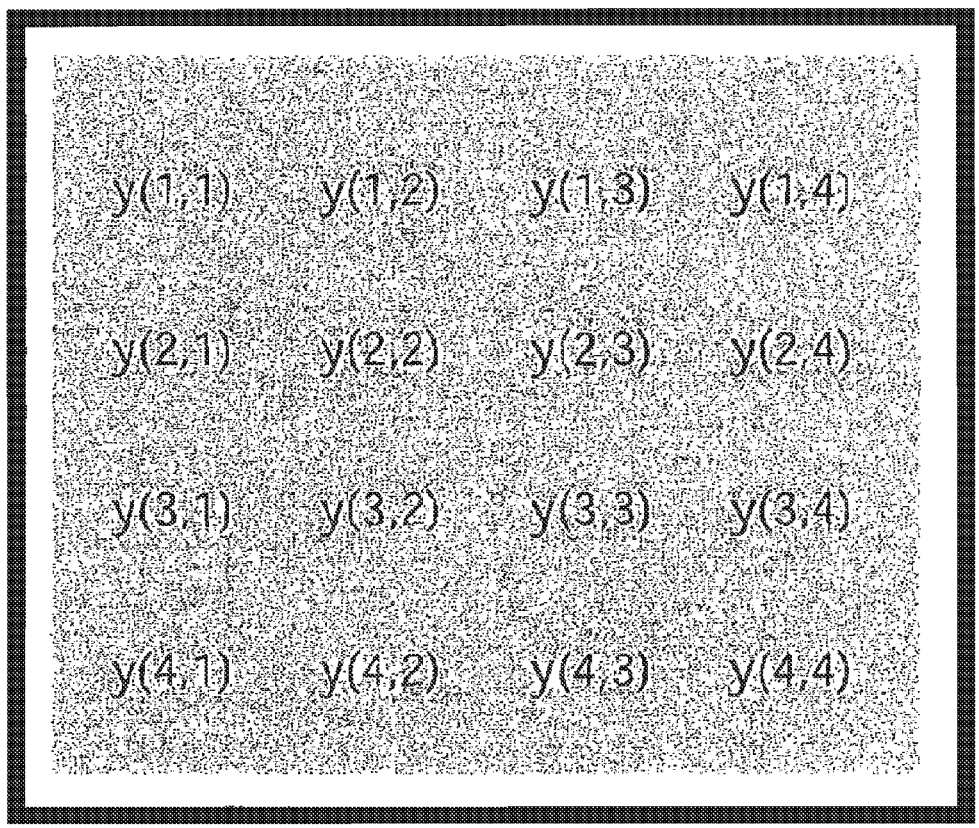
FIG. 6 shows the Original 4×4 Image.

The Subband predictive Transform source coding will now be described in more detail. The proposed scheme is next advanced by considering in detail a simple example that integrates the PT source coding scheme with the wavelets JPEG2000 subband approach. More specifically, we consider the compression of the 4×4 dimensional image depicted in FIG. 6 where {y(i,j)} denotes a pixel with the order pair (i,j) conveying the spatial location of the pixel.

The subband PT (SPT) algorithm begins with the evaluation of the average value $x_0$ of the given image {y(i,j)}, i.e., $$x_0 = \frac{1}{16} \sum_{i=1}^{4} \sum_{j=1}^{4} y(i, j) \quad (3.1)$$

This average value can be encoded with 8 bits.

Figure 7:
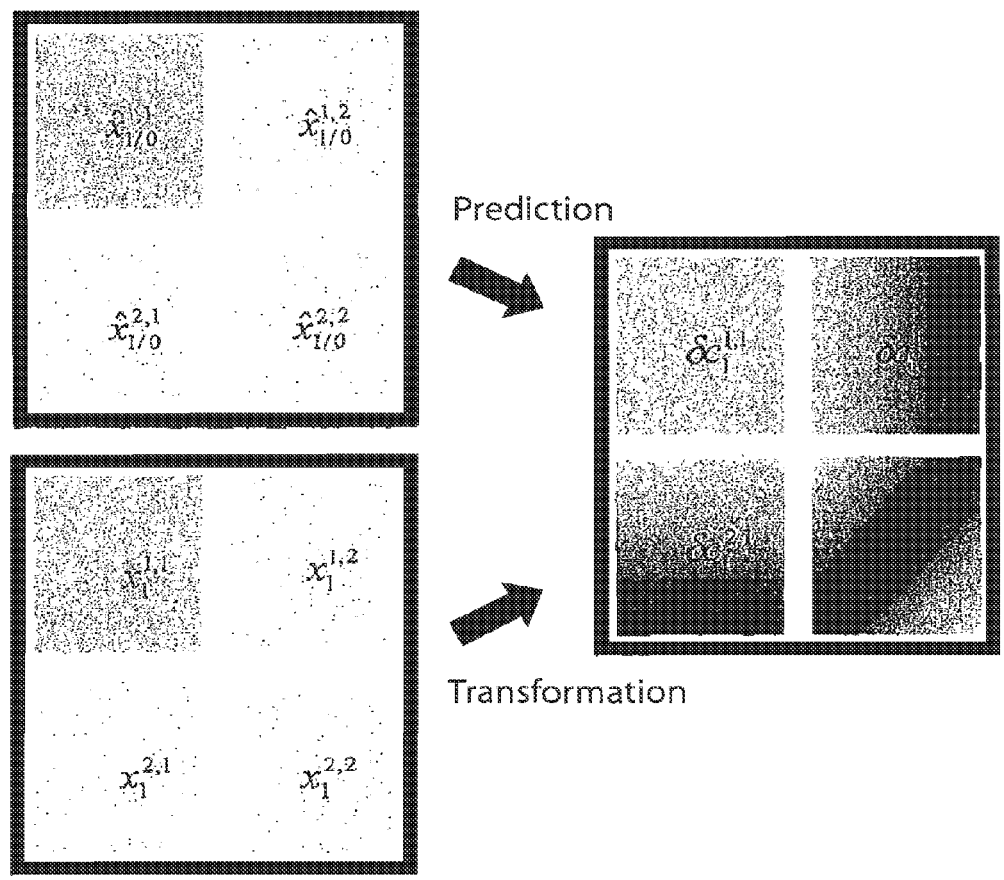
FIG. 7 shows a First Subband Predictive-Transform Pass.

Next the first subband is encoded as shown in FIG. 7. The picture contains three large squares where in each case it is internally made up of four smaller squares. The first large square to discuss is the one located on the lower left hand side of the image. It contains four scalar average values {$X_1^{k,l}$: k=1, 2 & l=1, 2} where $X_1^k$ denotes the average value of four adjacent pixels, i.e., $$x_1^{k,l} = \frac{1}{4} \sum_{i=2k-1}^{2k} \sum_{j=2l-1}^{2l} y(i, j) \quad (3.2)$$

These four values are in turn collected into the 4 dimensional column vector $X_1$, i.e., $$x_1 = [x_1^{1,1} x_1^{2,1} x_1^{1,2} x_1^{2,2}]^t. \quad (3.3)$$

This vector is then multiplied by a 4×4 unitary transform matrix T to generate the coefficient vector $c_1$, i.e., $$c_1 = T^t x_1. \quad (3.4)$$

Clearly, when this transformation matrix is the Hadamard transform we have the standard wavelets JPEG2000 approach

[1]. The second large square to investigate is placed on the upper left hand side of the image. It displays the predicted values for the four pixel averages (3.3). These predicted values are denoted by the set of four scalar elements $$\hat{x}_{1/0}^{k,l}:k=1,2\ \&\ l=1,2\}$$

where 'all' of these elements are given the same value of $X_0$ which is, as mentioned earlier, the average value of the entire image
(3.1). It then follows that our prediction vector for the transform coefficients is defined by the expression $$z_0 = \begin{bmatrix} \hat{x}_{1/0}^{1,1} \\ \hat{x}_{1/0}^{2,1} \\ \hat{x}_{1/0}^{1,2} \\ \hat{x}_{1/0}^{2,2} \end{bmatrix} = \begin{bmatrix} x_0 \\ x_0 \\ x_0 \\ x_0 \end{bmatrix} \quad (3.5)$$

The prediction vector $Z_0$ is then multiplied by a 4×4 prediction matrix P resulting in the prediction coefficient vector $\hat{c}_{1/0}$, i.e., $$\hat{c}_{1/0} = P^t z_0 \quad (3.6)$$

Next the design of T and P is addressed by using the isotropic image correlation model (2.7)-(2.10) with the real constant value of 's' added to $(rv)^2+h^2$. This is done to reflect the fact that the prediction (3.5) and predicted (3.3) averaged pixels are derived from the same pixel space but are extracted from different subband passes. Furthermore, assigning 0.99999 to both ρ and r, and using any value for K, the following T and P realizations are obtained when s=4:

$$T = \begin{bmatrix} 0.5 & -0.5 & 0.5 & 0.5 \\ 0.5 & -0.5 & -0.5 & -0.5 \\ 0.5 & 0.5 & 0.5 & -0.5 \\ 0.5 & 0.5 & -0.5 & 0.5 \end{bmatrix} \quad (3.7)$$

$$P = \begin{bmatrix} 0.5000 & -0.1545 & 0.1486 & 0.0172 \\ 0.5000 & -0.1545 & -0.1486 & -0.0172 \\ 0.5000 & 0.1545 & 0.1486 & -0.0172 \\ 0.5000 & 0.1545 & -0.1486 & 0.0172 \end{bmatrix} \quad (3.8)$$

Notice that the transform matrix (3.7) is the Hadamard transform [1]. However, this will not be the case in general when using a different averaged pixel block size. The difference between the coefficient vector $c_1$ and its predicted value $\hat{c}_{1/0}$ then results in the 4 dimensional coefficient error or innovation $\hat{c}_{1/0}$, i.e., $$\delta c_1 = \begin{bmatrix} \delta c_1^{1,1} \\ \delta c_1^{2,1} \\ \delta c_1^{1,2} \\ \delta c_1^{2,2} \end{bmatrix} = c_1 - \hat{c}_{1/0} = T^t x_0 - P^t z_0, \quad (3.9)$$

The four elements of $\delta c_i$ are depicted on the third large square located on the right hand side of FIG. 7. Note that attached to each of these coefficients errors is a background square with its shading representing the 2D drawing of the associated eigenvector that is extracted from the transform matrix (3.7). For instance, the shading associated with the coefficient $\delta c_1^{1,1}$ element is uniform in appearance since it corresponds to the DC eigenvector shown on the first column of the Hadamard transform (3.7).

Next, the coefficient error is quantized [1] yielding the quantization coefficient error $\delta \hat{c}_1$, i.e.

$$\delta \hat{c}_1 = \begin{bmatrix} \delta \hat{c}_1^{1,1} \\ \delta \hat{c}_1^{2,1} \\ \delta \hat{c}_1^{1,2} \\ \delta \hat{c}_1^{2,2} \end{bmatrix} = Q(\delta c_1) \quad (3.10)$$

The prediction coefficient vector $\hat{c}_{1/0}$ is then added to the quantized coefficient error $\delta \hat{c}_1$ to yield the estimated coefficient vector $\hat{c}_{1/1}$, i.e., $$\hat{c}_{1/1} = \hat{c}_{1/0} + \delta \hat{c}_1. \quad (3.11)$$

The estimated coefficient vector is then multiplied by the Hadamard transform (3.7) to yield an estimate $\hat{x}_{1/1}$, i.e., $$\hat{x}_{1/1} = \begin{bmatrix} \hat{x}_{1/1}^{1,1} \\ \hat{x}_{1/1}^{2,1} \\ \hat{x}_{1/1}^{1,2} \\ \hat{x}_{1/1}^{2,2} \end{bmatrix} = T \hat{c}_{1/1}. \quad (3.12)$$

of the 'first' subband average pixel values $X_1$ (3.3). This completes the first subband pass of the 4×4 pixel image of FIG. 6.

Figure 8:
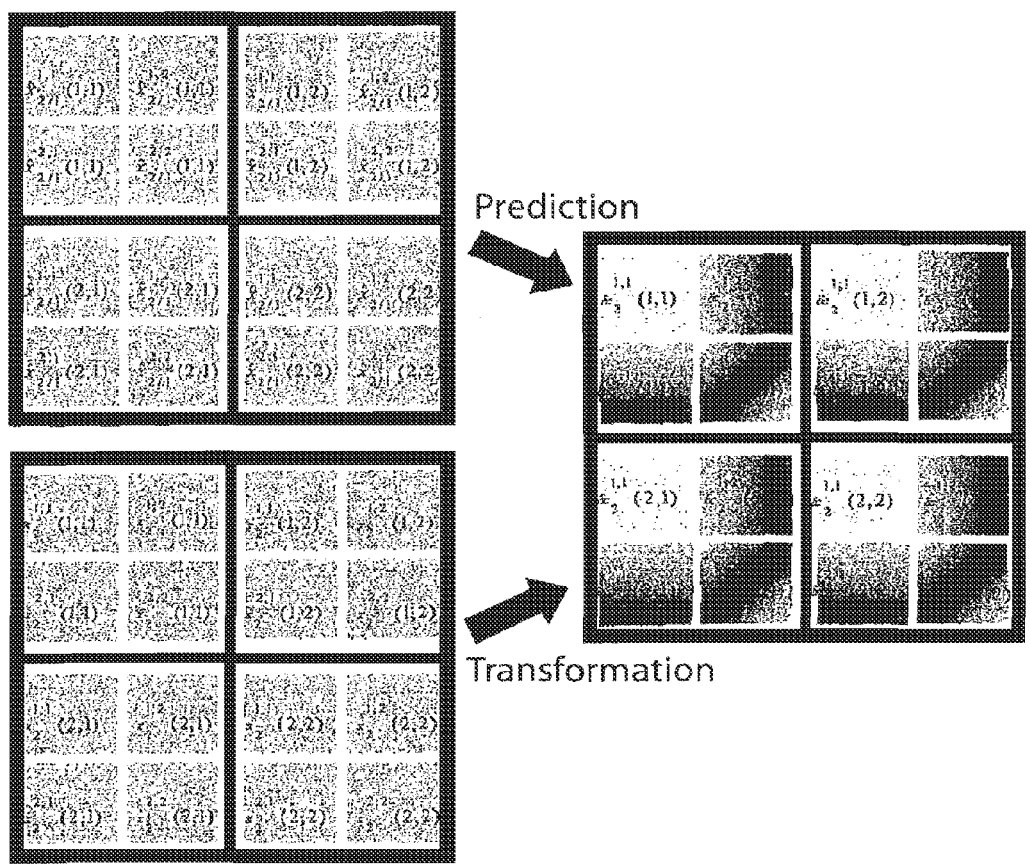
FIG. 8 shows a Second Subband Predictive-Transform Pass.

The description of the second and last subband pass of the proposed algorithm begins with an explanation of FIG. 8. As with FIG. 7, this figure is characterized by three large squares. In turn each of these large squares includes four identical sub-squares where each sub-square in conjunction with the corresponding sub-squares of the other two large squares can be explained similarly as was done earlier for the first subband pass. Furthermore, the required processing associated with each sub-square case will be found later to be perfectly independent of any processing pertaining to the remaining three sub-square cases. Thus parallelism can be used to yield a processing speed for this second subband pass that is governed by that of anyone of the identical Prediction Transformation sub-squares. The defining processing expressions for any sub-square case are next discussed in detail.

As was the case for the first subband pass the discussion begins with the large square located on the lower left hand side of the figure. Its four sub-squares, as is also the case for the other two large squares, are differentiated from each other by the order pair set (k,l), i.e., $$(k,l) \in \{(1,1),(2,1),(1,2),(2,2)\}, \quad (3.13)$$

as seen from the picture. For each (k,l) sub-square case the following 4 dimensional column vector $X_2(k,l)$ is then defined $$x_2(k,l) = \begin{bmatrix} x_2^{1,1}(k,l) \\ x_2^{1,2}(k,l) \\ x_2^{2,1}(k,l) \\ x_2^{2,2}(k,l) \end{bmatrix} \quad (3.14)$$

where $$x_2^{i,j}(k,l)=y(i+2(k-1),j+2(l-1)), \text{ for } \forall(i,j,k,l) \quad (3.15)$$

This vector is then multiplied by the Hadamard transform matrix T to generate the coefficient vector $c_2(k,l)$, i.e., $$c_2(k,l)=Tx_2(k,l). \quad (3.16)$$

The second large square on the upper left hand side of the image displays the prediction vector $$\hat{x}_{2/1}(k,l) = \begin{bmatrix} \hat{x}_{2/1}^{1,1}(k,l) \\ \hat{x}_{2/1}^{1,2}(k,l) \\ \hat{x}_{2/1}^{2,1}(k,l) \\ \hat{x}_{2/1}^{2,2}(k,l) \end{bmatrix} = \begin{bmatrix} \hat{x}_{1/1}^{k,l} \\ \hat{x}_{1/1}^{k,l} \\ \hat{x}_{1/1}^{k,l} \\ \hat{x}_{1/1}^{k,l} \end{bmatrix} \quad (3.17)$$

for the four pixels in (3.14). Note that all the elements in the prediction sub-square (k,l) are predicted with the same identical scalar value $\hat{x}_{1/1}^{k,l}$ that is available from the first subband pass. It now follows that our prediction vector for the transform coefficient vector $c_2(k,l)$ is defined by the expression $$z_1(k,l)=\hat{x}_{2/1}(k,l). \quad (3.18)$$

The prediction vector $\hat{c}_{2/2}(k,l)$ is then multiplied by the 4×4 prediction matrix P resulting in the prediction coefficient vector $\hat{c}_{2/1}(k,l)$, i.e., $$\hat{c}_{2/1}(k,l)=Pz_1(k,l). \quad (3.19)$$

The difference between the coefficient vector $c_2(k,l)$ and its predicted value $\hat{c}_{2/1}(k,l)$, then results in the 4 dimensional coefficient error or innovation $\delta c_2(k,l)$, i.e., $$\delta c_2(k,l) = \begin{bmatrix} \delta c_2^{1,1}(k,l) \\ \delta c_2^{2,1}(k,l) \\ \delta c_2^{1,2}(k,l) \\ \delta c_2^{2,2}(k,l) \end{bmatrix} = c_2(k,l) - \hat{c}_{2/1}(k,l) \quad (3.20)$$

that is plotted in the third large square of FIG. 8. This coefficient, error is then quantized to yield the quantized coefficient error $$\delta e_2(k,l)=Q(\delta c_2(k,l)). \quad (3.21)$$

A coefficient estimate $\hat{c}_{2/2}(k,l)$ of the coefficient vector $c_2(k,l)$ is then obtained by adding the predicted coefficient vector to the quantized coefficient error to yield $$\hat{c}_{2/2}(k,l)=\hat{c}_{2/1}(k,l)+\delta e_2(k,l) \quad (3.22)$$

Finally an estimate of the pixels (3.14)-(3.15) $\hat{x}_{2/2}(k,l)$ is derived by multiplying coefficient estimate (3.22) by the Hadamard transform to yield $$\hat{x}_{2/2}(k,l)=T\hat{c}_{2,2}(k,l). \quad (3.23)$$

This concludes the subband PT source coding methodology that can be readily extended to arbitrary size images.

Figure 9:
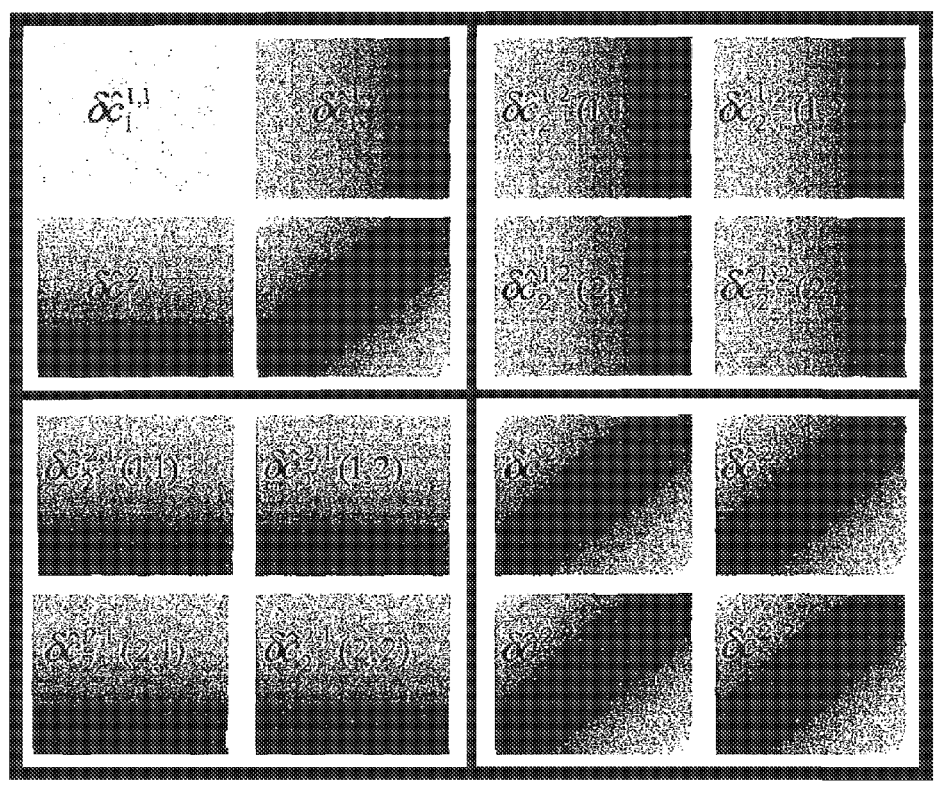
FIG. 9 shows a Coefficient Error Arrangement Using Standard Subband Organization.
Figure 10:
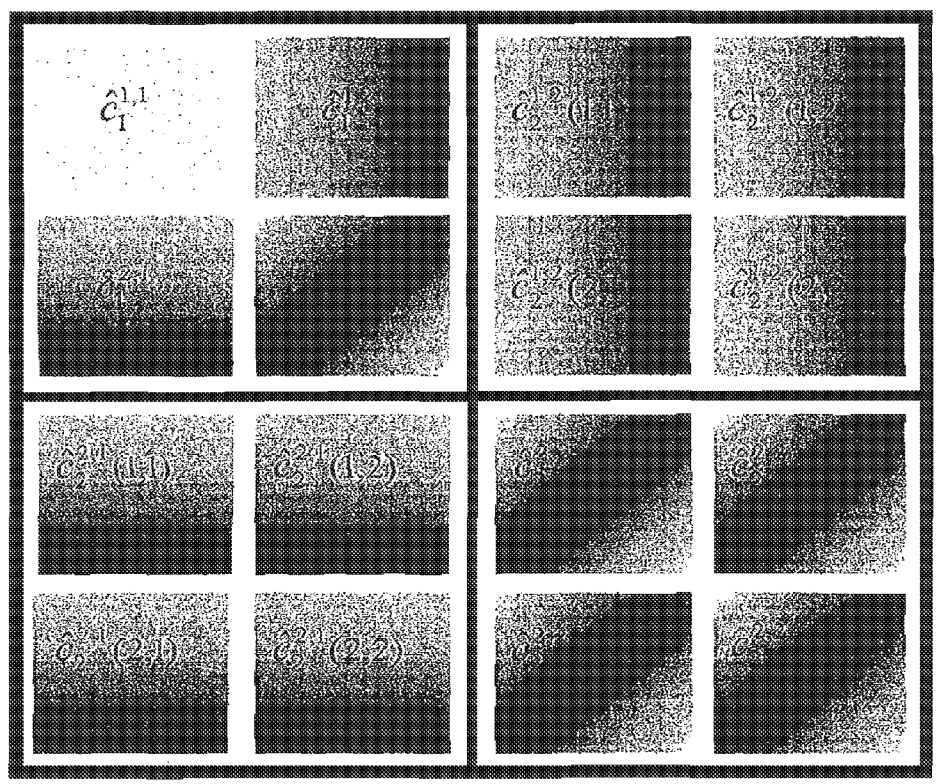
FIG. 10 shows a Coefficient Arrangement Using Standard Subband Organization.

In FIG. 9 the quantized 'coefficient errors' are displayed using the standard subband display [1]. Clearly, when the aforementioned prediction mechanism presented in (3.9) and (3.20) is inhibited the classical wavelets structure is derived which includes quantized 'coefficients' as shown in FIG. 10.

Figure 11:
FIG. 11 shows an original Lena image.
Figure 12:
FIG. 12 shows an MMSE PT compressed Lena image.
Figure 13:
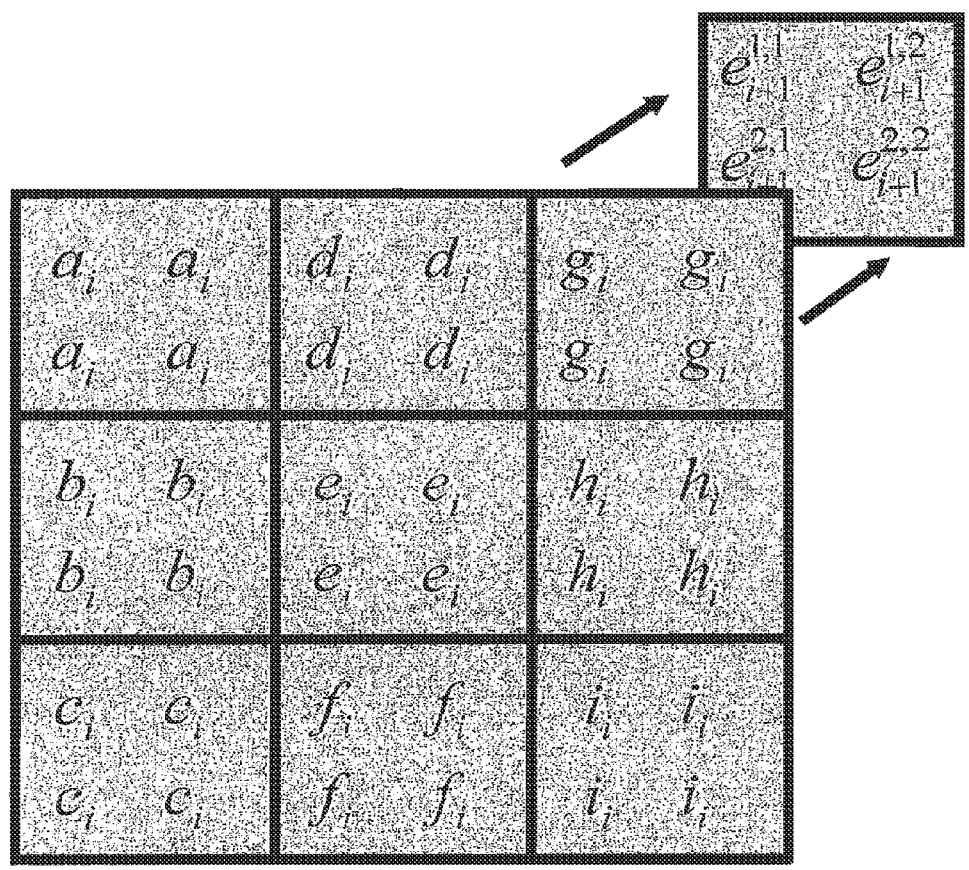
FIG. 13 shows a prediction geometry from nine 2×2 constant pixel block estimates in $i^{th}$ subband to 2×2 pixel block in $(i+1)^{th}$ subband, in accordance with the present invention.

Next in FIG. 12 the result is shown when the Lena image of FIG. 11 is highly compressed. Seven subbands were used where the prediction of each 2×2 pixel block was performed using 'nine' 2×2 constant pixel' block estimates derived from the previously encoded subband as seen from FIG. 13. The corresponding transform matrix T for this scheme was once again the Hadamard transform of (3.7) and for the prediction matrix P the following 36×4 matrix was derived:

$$P = \begin{matrix}
0.0257 & -0.0070 & 0.0076 & -0.0027 \\
0.0170 & -0.0093 & 0.0050 & -0.0039 \\
0.0273 & -0.0158 & 0.0041 & -0.0032 \\
0.0273 & -0.0158 & -0.0033 & 0.0024 \\
0.0170 & -0.0093 & -0.0046 & 0.0034 \\
0.0257 & -0.0070 & -0.0069 & 0.0019 \\
0.0170 & -0.0047 & 0.0097 & -0.0039 \\
0.0335 & -0.0210 & 0.0217 & -0.0152 \\
0.0802 & -0.0508 & 0.0222 & -0.0165 \\
0.0802 & -0.0508 & -0.0199 & 0.0139 \\
0.0335 & -0.0210 & -0.0208 & 0.0141 \\
0.0170 & -0.0047 & -0.0092 & 0.0034 \\
0.0274 & -0.0034 & 0.0165 & -0.0033 \\
0.0803 & -0.0204 & 0.0527 & -0.0165 \\
0.1917 & -0.0541 & 0.0585 & -0.0225 \\
0.1917 & -0.0541 & -0.0532 & 0.0163 \\
0.0803 & -0.0204 & -0.0505 & 0.0140 \\
0.0274 & -0.0034 & -0.0158 & 0.0024 \\
0.0274 & -0.0034 & 0.0158 & 0.0024 \\
0.0803 & 0.0204 & 0.0505 & 0.0140 \\
0.1917 & 0.0541 & 0.0532 & 0.0163 \\
0.1917 & 0.0541 & -0.0585 & -0.0225 \\
0.0803 & 0.0204 & -0.0527 & -0.0165 \\
0.0274 & 0.0034 & -0.0165 & -0.0033 \\
0.0170 & 0.0047 & 0.0092 & 0.0034 \\
0.0335 & 0.0210 & 0.0208 & 0.0141 \\
0.0802 & 0.0508 & 0.0199 & 0.0139 \\
0.0802 & 0.0508 & -0.0222 & -0.0165 \\
0.0335 & 0.0210 & -0.0217 & -0.0152 \\
0.0170 & 0.0047 & -0.0097 & -0.0039 \\
0.0257 & 0.0070 & 0.0069 & 0.0019 \\
0.0170 & 0.0093 & 0.0046 & 0.0034 \\
0.0273 & 0.0158 & 0.0033 & 0.0024 \\
0.0273 & 0.0158 & -0.0041 & -0.0032 \\
0.0170 & 0.0093 & -0.0050 & -0.0039 \\
0.0257 & 0.0070 & -0.0076 & -0.0027
\end{matrix}$$

The PSNR of the MMSE PT compressed Lena image of FIG. 12 is 29.51 dBs and the number of bytes needed for its storage is 3,395 bytes which in JPEG2000 produces a compressed Lena image with PShlR of 28.84 dBs. The aforementioned number of bytes was achieved using a subband version of the straightforward bit planes methodology introduced in [2]. Nonlinear quantizers were applied to the last subband coefficient errors where Gaussian distributions were assumed for them. In addition, the linear quantizer of (2.2) with g=0.025 was used for the remaining subbands. Notice the acceptable visual image quality derived for such a high level of compression. Clearly a better perceptual image quality as well as a greater compression level may be achieved with the use of nonlinear quantizers for all subbands and/or some appropriate type of post-processing.

The best image isotropic model parameter 's' value to use for each possible level of compression and/or subband remains to be investigated. In addition, it is noticed that the proposed methodology can be readily applied to any averaged pixel block size processing structure which naturally includes that of a strip processor [2]. This problem is being investigated and further results will be forthcoming in the near future.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A method for compression of an image on a computing system, comprising:
    performing a first minimum mean squared error (MMSE) predictive-transform (PT) operation on the image based on a first isotropic image correlation model and a first average value of a plurality of adjacent pixels within a first pixel block in the image to generate a subband estimate vector;
    performing a second MMSE PT operation on the image based on the subband estimate vector, a second isotropic image correlation model, and a second average value of a plurality of adjacent pixels within a second pixel block in the image to generate a compressed version of the image; and
    providing the compressed version of the image.

2. A method for compression of an image on a computing system, comprising:
    performing a first minimum mean squared error (MMSE) predictive-transform (PT) operation on the image based on a first isotropic image correlation model and a first average value of a plurality of adjacent pixels within a first pixel block in the image to generate a subband estimate vector;
    performing a second MMSE PT operation on the image based on the subband estimate vector, a second isotropic image correlation model, and a second average value of a plurality of adjacent pixels within a second pixel block in the image to generate a compressed version of the image; and
    providing the compressed version of the image;
    wherein performing the first MMSE PT operation comprises:
    generating a transform matrix and a prediction matrix based on the first isotropic image correlation model;
    averaging a value for every pixel in the image to generate an average value;
    multiplying the transform matrix and the first average value of the plurality of adjacent pixels in the image within the first pixel block to generate a coefficient vector, wherein a size of the first pixel block is smaller than a size of the image;
    multiplying the prediction matrix and a prediction vector to generate a prediction coefficient vector, wherein the prediction vector is based on the average value;
    taking a difference between the coefficient vector and the prediction coefficient vector to generate a coefficient error vector;
    quantizing the coefficient error vector to generate a quantization coefficient error vector;
    adding the prediction coefficient vector to the quantization coefficient error vector to generate a coefficient estimated vector; and
    multiplying the coefficient estimated vector by the transform matrix to generate the subband estimate vector.

3. A method for compression of an image on a computing system, comprising:
    performing a first minimum mean squared error (MMSE) predictive-transform (PT) operation on the image based on a first isotropic image correlation model and a first average value of a plurality of adjacent pixels within a first pixel block in the image to generate a subband estimate vector;
    performing a second MMSE PT operation on the image based on the subband estimate vector, a second isotropic image correlation model, and a second average value of a plurality of adjacent pixels within a second pixel block in the image to generate a compressed version of the image; and
    providing the compressed version of the image;
    wherein performing the second MMSE PT operation comprises:
    generating a transform matrix and a prediction matrix based on the second isotropic image correlation model;
    multiplying the transform matrix and the second average value of the plurality of adjacent pixels in the image within the second pixel block to generate a coefficient vector, wherein a size of the second pixel block is smaller than a size of the image;
    multiplying the prediction matrix and the subband estimate vector to generate a prediction coefficient vector;
    taking a difference between the coefficient vector and the prediction coefficient vector to generate a coefficient error vector;
    quantizing the coefficient error vector to generate a quantization coefficient error vector;
    adding the prediction coefficient vector to the quantization coefficient error vector to generate a coefficient estimated vector; and
    multiplying the coefficient estimated vector by the transform matrix to generate the compressed version of the image.

4. The method of claim 2 wherein the transform matrix is a Hadamard transform.

* * * * *